Dec. 2, 1958    M. L. SALTER    2,862,428
CAMERA DEVICE TO PRODUCE IMPROVED THREE-DIMENSIONAL EFFECTS
Filed July 28, 1952

INVENTOR.
MANUEL L. SALTER
BY
Walter S. Pawl
ATTORNEY

2,862,428

CAMERA DEVICE TO PRODUCE IMPROVED THREE-DIMENSIONAL EFFECTS

Manuel Lee Salter, New York, N. Y.

Application July 28, 1952, Serial No. 301,229

4 Claims. (Cl. 95—11)

The camera device for producing three-dimensional effects is essentially a camera within a sphere; it consists of a sphere, or near sphere, with lens mounted inside (and, or) supplementary lens or lenses outside, optically adjusted to catch the light image which enters through the shutters of the camera box. The sphere is filled with a heavy, clear (transparent) substance of a density to transmit the image to the image surface. Instantaneously the light image is recorded on the curved film, which is close to or touching the film area of the sphere. The sphere is opaque except the lens area through which the light image enters and the film area through which the light image is recorded on the film. The basic camera device for three-dimensional effects is an artificial-eye camera modeled after the human eye. The pictures thereby give the appearance of normal perspective in accordance with the human eye.

The camera device for producing three-dimensional effects advances the photographic art through its improvement in the definite appearance of depth in the pictures produced.

The basic camera structure in the present device for improving three-dimensional effects, together with its product, will appeal to several major industries, including camera manufacturing, motion picture producing, motion picture exhibiting, the television industry, the picture magazines and newspapers, the advertising concerns, the photographic studios, and the work of the individual photographer. Its intrinsic value to industry and to the individual is great and immediate.

Figure 1:
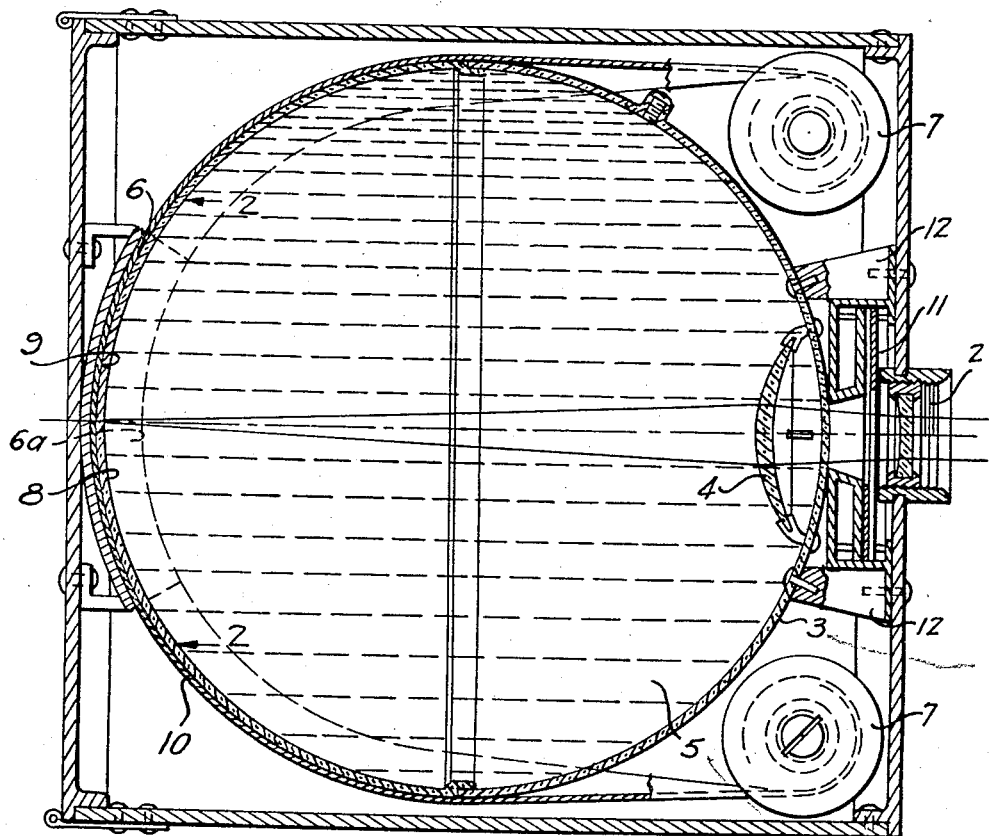
Figure 2:
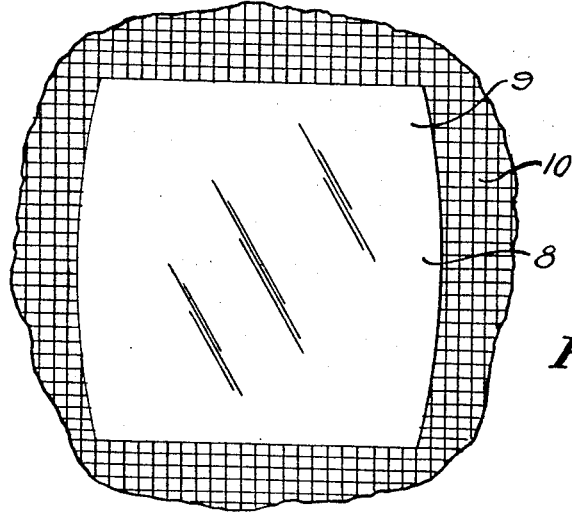

Although many designs and arrangements of parts are possible, one simple form of the invention is illustrated in the accompanying drawing, in which Figure 1 is a vertical section of the completed basic device for producing three-dimensional effects; and Figure 2, a full-front internal view of the image aperture taken on the line 2—2 of Fig. 1.

In Figure 1 we see how the light image enters the camera box through the opening 2 and is timed and its amount controlled by the shutter 11. The light passes on to the lens area of the transparent sphere 3, secured to the mounting 12, 12, and filled with heavy clear oil 5, through the lens 4, inserted in the oil within the front part of the sphere, and on through the sphere to the curved film 6, touching the sphere and wound on rollers 7, 7. The image produced on the film by the use of this device has a three-dimensional effect. Negatives, prints and enlargements may be made in the usual way.

Figure 1 shows the lens 4 in its position in the sphere 3 and the exposed part of the film area 6a behind the lens as seen through the sphere filled with heavy oil 5.

Figure 2 is an internal front view of the image aperture of the sphere. The entrance aperture area of the lens face 8 and the film area 9 thereof are not covered with the opaque section or cover 10 used to shield the image against extraneous light sources.

The size of the image may be determined by the type of lens (convex, concave, double convex, etc., used alone or in combination with the same or other types). The clarity and the contours of the image may be controlled in like manner.

I am aware that various adjustments and many arrangements of the parts of this device for making three-dimensional effects are possible. They concern every part of the device, but especially the sphere, the filling and the lens.

I am aware that instead of the sphere, the near sphere may be used. The part sphere with compensating lens or plurality of lenses may be substituted for the sphere. It is possible to have a divided sphere with intervening section or sections of many shapes or designs.

I am aware that the filling need not be the heavy clear liquid described above. The filling may be another liquid, a clear gelatinous matter, a solid, a gas, alone or in combination (or combinations). Even a vacuum may be used in this part of the device. The spherical or part-spherical chamber may be constructed of many and varied substances, alone or in combination, at the will or whim of the engineer or manufacturer.

I am aware that the placement of lens or plurality of lenses may be many and varied. The lens inside may be supplemented with lens or lenses outside of the sphere; any combination or combinations of these positions may be used also. In some cases mirrors may even be employed.

Having now described and illustrated one form of my invention and having mentioned several forms with different arrangements and other variations, I wish it to be understood that my invention is not to be limited to the specific form or arrangements of parts herein described and shown, but shall be more broadly covered by my claims in accordance with the spirit and scope of the present invention.

I claim:

1. A camera comprising a camera casing, a lens element of substantial depth and having substantially concentric convex spherical surfaces for its object and image faces, and having light entrance and exit apertures on its object and image faces respectively, said lens element having an opaque covering over its entire surface except for said apertures, the front wall of said casing having rearwardly projecting brackets for supporting said lens element in said casing behind said entrance aperture on said object face of said lens element, a light aperture in the front wall of said casing aligned with said lens element, means forwardly of said exit aperture at the sides of said lens element for holding a curved film substantially contiguously with and across said image face over said exit aperture and a converging lens completely embedded in said deep lens, with its axis in optical alignment with said entrance and exit apertures, said converging lens having an index of refraction such that in combination with the index of refraction of the lens element it will cause a sharp image to be focused on the spherical surface in said exit aperture.

2. A camera as defined in claim 1, wherein said lens element is composed of a transparent fluid medium enclosed in a casing having transparent faces of negligible thickness.

3. A camera as defined in claim 2, wherein said liquid is a mineral oil.

4. A camera as defined in claim 1, and an object lens placed in front of said lens entrance aperture in said light aperture of the front wall of said camera casing, the spacing of said converging lens, said lens element and said object lens being adjusted to cause a sharp image to be focused on the spherical surface.

References Cited in the file of this patent

UNITED STATES PATENTS

| | | |
|---|---|---|
| 1,378,011 | Creiger | May 17, 1921 |
| 1,582,199 | Walters | Apr. 27, 1926 |
| 2,002,090 | Ives | May 21, 1935 |
| 2,358,092 | Luboshez | Sept. 12, 1944 |
| 2,402,216 | Vennigerholz | June 18, 1946 |

FOREIGN PATENTS

| | | |
|---|---|---|
| 2,193 | Great Britain | of 1859 |